G. WILLIAMSON.
CHUCK.
APPLICATION FILED JAN. 13, 1917.
1,391,440.
Patented Sept. 20, 1921.
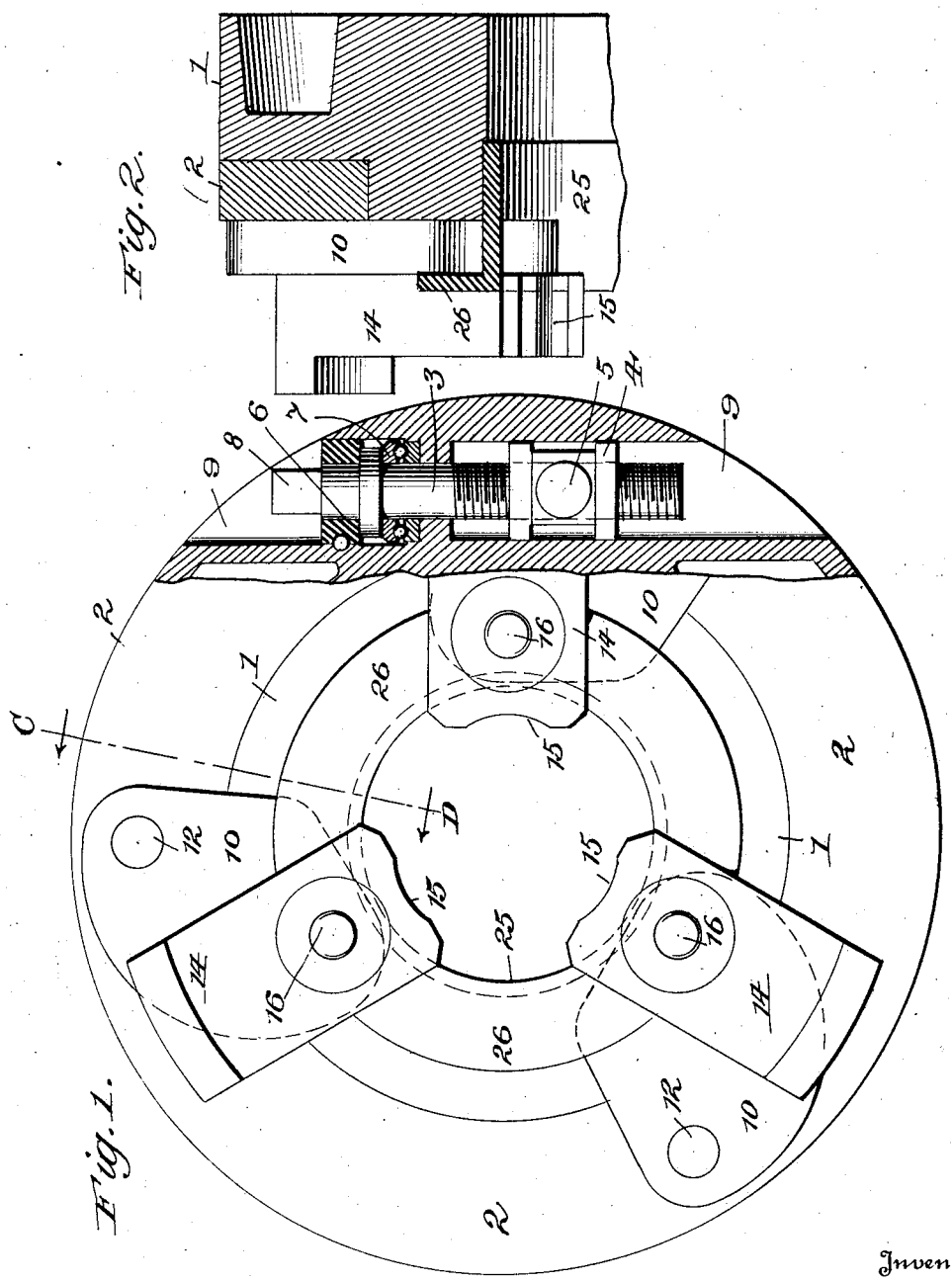
Inventor
George Williamson
By Dodge and Sons
Assoc Attorneys

UNITED STATES PATENT OFFICE.

GEORGE WILLIAMSON, OF OLDHAM, ENGLAND.

CHUCK.

1,391,440.  Specification of Letters Patent.  Patented Sept. 20, 1921.

Filed January 13, 1917. Serial No. 142,210.

*To all whom it may concern:*

Be it known that I, GEORGE WILLIAMSON, a subject of the King of Great Britain, residing at Oldham, in the county of Lancaster, in the Kingdom of England, have invented certain new and useful Improvements in Chucks, of which the following is a specification.

This invention relates to chucks and like rotary work or tool holders applicable for use in connection with work centering apparatus, or for use in connection with holding an object to cause it to be rotated as with a mandrel of a lathe, or for other purposes.

Scroll chucks wherein the jaws are made to advance toward or recede from the center to an equal extent, while serving their purpose very well, possess the disadvantage that the use of scrolls together with bevel wheels and pinions add considerably to the cost of the chuck, and the present invention has been designed to provide an efficient chuck or work holder wherein the use of these scrolls is avoided, and the motion of the jaws is effected by other means.

The invention will be understood from the following description, reference being had to the accompanying drawings, in which,—

Figure 1 is a sectional elevation of a chuck embodying my invention; and

Fig. 2 a detailed cross sectional view taken on the line C D of Fig. 1.

Referring to the drawings the chuck body, denoted by 1, is provided with a ring 2 which is capable of being turned through the segment of a circle by means of a screwed spindle 3 engaging a nut 4 mounted on a pin 5 projecting from the ring 2. This screwed spindle 3 is journaled at 6 in the chuck body 1 and operates against ball bearing washers 7 to resist end thrust. The spindle is operated by a box key adapted to engage the squared end 8 of the spindle which lies in a recess 9 in the chuck body so as not to project therefrom, and the ring 2 is recessed into the face of the chuck body 1 so as to lie flush therewith. Arranged around the axial center line of the chuck is a plurality of carrier members 10, three being shown in the instant case. Said carrier members are alike in form as are also the jaws employed in conjunction therewith, and a description of one set will suffice for all. The carrier or carrier member 10 is pivotally secured to the ring 2 through a pivot pin 12 and the jaw 14 is likewise secured to the carrier member through a pin 16. Each jaw is likewise provided with engaging faces 15, as is common in the art. A tubular member 25 is spigoted into the central bore of the chuck body, as best seen in Fig. 2, the said member being provided with a laterally extending flange 26. Said flange is recessed or cut away, forming guides in which the jaws 14 are mounted. Upon a manipulation of the spindle screw 3 the ring 2 will be turned with reference to the chuck body and as a consequence the jaws will be moved radially inward or outward through the swinging movement of the carrier members 10; at the same time the tubular member 25 will likewise be turned thereby maintaining the radial position of the jaws and preventing them getting askew.

It is to be understood I do not desire to limit myself to the exact details of construction but claim the right to use any and all modifications thereof which will serve for carrying into effect the objects to be attained in so far as such forms and changes may fall within the spirit and scope of the invention hereinbefore referred to.

What is claimed is:—

1. In a device for the purposes mentioned, the combination of a chuck body, a revoluble ring mounted thereon: carrier members pivoted to the front of the ring, work (or tool) engaging or work centering jaws mounted on the carriers, a central tubular member provided with an outside flange and freely mounted in the bore of the chuck body, and recesses in the outside flange of the said tubular member, in which the said jaws are mounted, whereby the turning of the ring will adjust the jaws with relation to the axis of the chuck, and also turn the tubular member so as to keep the jaws in the radial position.

2. In a device for the purpose mentioned, the combination of a chuck body; a ring revolubly mounted thereon; a plurality of carrier members pivoted to the ring; a plurality of work (or tool) engaging or work centering jaws; a pin connection between each of said carriers and its jaw, a tubular member mounted in the bore of the chuck body and adapted to be rotated therein, said member being provided with a laterally extending flange having recesses in which said jaws are mounted; means for securing a turning movement of the ring whereby such movement will adjust the jaws inwardly and outwardly in a radial direction and likewise effect a turning movement of the tubular member so as to maintain the jaws in their radial position.

In witness whereof, I have hereunto signed my name this 18th day of December, 1916, in the presence of two subscribing witnesses.

GEORGE WILLIAMSON.

Witnesses:
CHARLES PORTER RODWELL,
EWALD SIMPSON MOSELEY.